US011293313B2

(12) United States Patent
Alkhowaiter

(10) Patent No.: US 11,293,313 B2
(45) Date of Patent: Apr. 5, 2022

(54) TURBOMACHINERY LUBRICATION SYSTEM IMPROVEMENT GRAVITY RUNDOWN TANKS

(71) Applicant: Saudi Arabian Oil Company, Dhahran (SA)

(72) Inventor: Abdulrahman Alkhowaiter, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 837 days.

(21) Appl. No.: 16/135,263

(22) Filed: Sep. 19, 2018

(65) Prior Publication Data

US 2020/0088074 A1  Mar. 19, 2020

(51) Int. Cl.
 *F01M 1/16* (2006.01)
 *F01D 25/18* (2006.01)
 *F16N 29/02* (2006.01)

(52) U.S. Cl.
CPC .............. *F01M 1/16* (2013.01); *F01D 25/18* (2013.01); *F16C 2360/23* (2013.01); *F16N 29/02* (2013.01)

(58) Field of Classification Search
CPC ............................. F01D 25/18; F16C 2360/23
(Continued)

(56) References Cited

U.S. PATENT DOCUMENTS 3,147,821 A * 9/1964 Eggenberger ........... F16N 29/00
 184/109
3,424,374 A * 1/1969 Robey ................. F16C 33/6674
 417/368
(Continued)

FOREIGN PATENT DOCUMENTS

DE  10324986  * 12/2004
DE  102013110843  4/2015
(Continued)

OTHER PUBLICATIONS

International Search Report and Written Opinion issued in International Application No. PCT/US2019/051678 dated Nov. 25, 2019, 16 pages.
(Continued)

*Primary Examiner* — Michael R Mansen
*Assistant Examiner* — Mark K Buse
(74) *Attorney, Agent, or Firm* — Fish & Richardson P.C.

(57) ABSTRACT

A pressurized lubrication system for turbomachinery includes a gravity rundown lubrication tank raised vertically above a turbomachinery train. The gravity rundown tank is typically designed to provide emergency fluid lubrication during shutdown if the main and standby lubrication pumps fail to operate. This invention describes a gravity rundown tank with additional novel function of providing higher pressure Accumulator action lubrication fluid to delay and prevent a shutdown trip of the turbomachinery. The gravity rundown tank with novel features can be a single tank with multiple functions, or a plurality of tanks utilizing gravity pressure to ensure emergency lubrication at rundown, and providing accumulator action delay pressure and flow when switching from main to standby lubrication pumps. This improvement in the state of the art leads to eliminating the need for conventional equipment such as Accumulators thus providing higher lubrication system reliability and minimizing cost and complexity.

26 Claims, 5 Drawing Sheets

(58) Field of Classification Search
USPC .......................................................... 184/65
See application file for complete search history.

(56) References Cited

U.S. PATENT DOCUMENTS

| | | | | |
|---|---|---|---|---|
| 4,390,082 | A * | 6/1983 | Swearingen | F01D 25/18 184/6.4 |
| 4,717,000 | A * | 1/1988 | Waddington | F01D 25/18 184/6.1 |
| 4,917,218 | A * | 4/1990 | Murray | F01D 25/18 184/107 |
| 5,018,601 | A * | 5/1991 | Waddington | F01D 25/18 184/6.11 |
| 5,329,771 | A * | 7/1994 | Kytomaki | F01D 25/18 184/6.22 |
| 5,626,470 | A * | 5/1997 | Gerhardt | F04C 29/0021 184/6 |
| 6,267,147 | B1 | 7/2001 | Rago | |
| 7,174,997 | B2 | 2/2007 | Sheridan | |
| 2003/0230274 | A1* | 12/2003 | Williams | F01M 5/005 123/196 R |
| 2011/0010069 | A1* | 1/2011 | Payne | F01D 25/18 701/100 |
| 2011/0303491 | A1 | 12/2011 | Jenkins | |
| 2013/0218399 | A1* | 8/2013 | Demaison | F01M 11/12 701/31.4 |
| 2015/0252944 | A1* | 9/2015 | Kreutzkaemper | F16N 7/40 184/6.1 |
| 2016/0047281 | A1* | 2/2016 | Bastian | F01M 1/16 184/6.1 |
| 2016/0160686 | A1* | 6/2016 | Cigal | F01D 25/18 184/6.11 |
| 2016/0363006 | A1* | 12/2016 | Bohler | F16H 35/18 |

FOREIGN PATENT DOCUMENTS

| | | |
|---|---|---|
| EP | 1500804 | 1/2005 |
| FR | 1465269 | 1/1967 |
| GB | 1167692 | 10/1969 |

OTHER PUBLICATIONS

GCC Examination Report in GCC Appln. No. GC 2019-38311, dated Oct. 22, 2020, 6 pages.

* cited by examiner

500

502 — selectively opening, with a check valve or control valve, a conduit connecting a gravity rundown lubrication tank and a main lubrication fluid supply header of a turbomachinery system in response to a pressure differential between the main lubrication fluid supply header and a static pressure of the gravity rundown lubrication tank 504 — in response to a lubrication fluid pressure in the main lubrication fluid supply header dropping below a backup fluid pressure threshold, flowing a first portion of a lubrication fluid from the gravity rundown lubrication tank to the main lubrication fluid supply header for a first time duration and at a first pressure less than the backup fluid pressure threshold and greater than an emergency shutdown pressure threshold of the turbomachinery system

FIG. 5

TURBOMACHINERY LUBRICATION SYSTEM IMPROVEMENT GRAVITY RUNDOWN TANKS

TECHNICAL FIELD

This disclosure relates to Turbomachinery Lubrication System Gravity Rundown Tanks for pressure lubricated turbomachinery.

BACKGROUND

Force feed lubrication fluid systems are used for large rotating equipment and turbomachinery, such as heavy duty pumps, compressors, gas turbines, and steam turbines. These lubrication fluid systems frequently include a gravity rundown lubrication tank that provides lubrication fluid flow to a rotating equipment during a loss of normal lubrication pumps pressure and an emergency shutdown and coast-down of the rotating equipment occurs. The gravity rundown lubrication tank is installed at a certain height above the shaft centerline of the rotating equipment that provides gravity flow of lubrication oil to the rotating equipment after shutdown during coast-down of the rotating equipment. The elevation of the gravity rundown lubrication tank provides static pressure for sufficient lubrication fluid flow under gravity after an emergency shutdown process is initiated. The tank volume of fluid is calculated to provide sufficient lubrication flowrate during the expected machinery coast-down time from operating speed to standstill.

SUMMARY

This disclosure describes gravity rundown lubrication tanks modified to provide dual functions of backup lubrication Accumulator action pressure-flow and conventional function of emergency lubrication to turbomachinery during coastdown.

Some aspects of the disclosure encompass a method for lubricating a turbomachinery system. The method includes retaining a lubrication fluid with a gravity rundown lubrication tank disposed vertically above a main lubrication fluid supply header of a turbomachinery system. The gravity rundown lubrication tank is fluidly connected to the main lubrication fluid supply header by a fluid conduit configured to selectively flow lubrication fluid in response to a pressure differential between a lubrication fluid pressure in the main lubrication fluid supply header and a static pressure of the gravity rundown lubrication tank. The method includes, in response to the lubrication fluid pressure in the main lubrication fluid supply header dropping below a backup fluid pressure threshold, flowing a first portion of the lubrication fluid from the gravity rundown lubrication tank to the main lubrication fluid supply header at a first pressure between the backup fluid pressure threshold and a shutdown trip pressure threshold of the main lubrication fluid supply header, the shutdown trip pressure threshold being less than the backup fluid pressure threshold.

This, and other aspects, can include one or more of the following features. The method can include, in response to the lubrication fluid pressure in the main lubrication fluid supply header dropping below the shutdown trip pressure threshold, flowing a second portion of the lubrication fluid from the gravity rundown lubrication tank to the main lubrication fluid supply header at a second pressure less than or equal to the shutdown trip pressure threshold. The method can include retaining a second portion of lubrication fluid with a second gravity rundown lubrication tank disposed vertically above the main lubrication fluid supply header and vertically below the first-mentioned gravity rundown lubrication tank, the second gravity rundown lubrication tank fluidly connected to the main lubrication fluid supply header by a second fluid conduit configured to selectively flow lubrication fluid in response to a pressure differential between the lubrication fluid pressure in the main lubrication fluid supply header and a static pressure of the second gravity rundown lubrication tank, and in response to the lubrication fluid pressure in the main lubrication fluid supply header dropping below the shutdown trip pressure threshold, flowing a second portion of lubrication fluid from the second gravity rundown lubrication tank to the main lubrication fluid supply header at a second pressure less than or equal to the shutdown trip pressure threshold. The second fluid conduit can include a second control valve, the second control valve including at least one of a passive one-way check valve or an active isolation valve configured to open the second fluid conduit in response to the static pressure of the second gravity rundown lubrication tank being greater than the lubrication fluid pressure in the main lubrication fluid supply header. The method can include detecting, with a pressure sensor, the lubrication fluid pressure in the main lubrication fluid supply header to be less than or equal to the shutdown trip pressure threshold. The method can include detecting, with the pressure sensor, the lubrication fluid pressure in the main lubrication fluid supply header to be less than a low-level pressure threshold, and, in response to detecting the lubrication fluid pressure to be less than the low-level pressure threshold and prior to supplying the first portion of the lubrication fluid from the gravity rundown lubrication tank to the main lubrication fluid supply header, initiating a standby pump configured to supply lubrication fluid to the main lubrication fluid supply header at a standby pressure greater than the low-level pressure threshold, where the low-level pressure threshold is greater than the backup fluid pressure threshold. The low-level pressure threshold can be about 15 psi. The method can include detecting, with a fluid level sensor, a static height of the lubrication fluid in the main lubrication fluid supply header to be lower than a shutdown fluid level threshold height, and in response to detecting the static height of the lubrication fluid in the main lubrication fluid supply header to be lower than the shutdown fluid level threshold height, flowing a second portion of the lubrication fluid from the gravity rundown lubrication tank to the main lubrication fluid supply header at a second pressure less than or equal to the shutdown trip pressure threshold. The shutdown trip pressure threshold can be between 9 psi and 10 psi, and the backup fluid pressure threshold can be between 11 psi and 12 psi. The fluid conduit can include a passive control valve, the passive control valve including a passive one-way check valve configured to open in response to the static pressure of the gravity rundown lubrication tank being greater than the lubrication fluid pressure in the main lubrication fluid supply header. The fluid conduit can include an active control valve, the active control valve including an active isolation valve configured to open in response to the static pressure of the gravity rundown lubrication tank being greater than the lubrication fluid pressure in the main lubrication fluid supply header. Flowing the first portion of the lubrication fluid from the gravity rundown lubrication tank to the main lubrication fluid supply header at the first pressure can include flowing the first portion of the lubrication fluid for a first time duration between five seconds and thirty seconds. Flowing the first portion of the lubrication fluid for the first time duration can include flowing the first portion of the lubrication fluid at the first pressure, where the first pressure decreases during the first time duration toward the shutdown trip pressure threshold. Flowing the first portion of the lubrication fluid from the gravity rundown lubrication tank to the main lubrication fluid supply header at the first pressure can include flowing the first portion of the lubrication fluid out of the gravity rundown lubrication tank such that the static pressure of the gravity rundown lubrication tank decreases from the backup fluid pressure threshold to the shutdown trip pressure threshold.

Certain aspects encompass a system including a turbomachinery system having a turbomachinery bearing, a main lubrication fluid supply header fluidly coupled to the turbomachinery bearing, a gravity rundown lubrication tank including a fluid storage chamber to retain a lubrication fluid in the gravity rundown lubrication tank, the gravity rundown lubrication tank positioned vertically above the turbomachinery system such that the lubrication fluid of the gravity rundown lubrication tank comprises a static pressure based at least in part on a vertical height of a topmost level of the lubrication fluid vertically above the turbomachinery system, and a flow control system fluidly connecting the fluid storage chamber to the main lubrication fluid supply header, the flow control system configured to selectively flow the lubrication fluid from the fluid storage chamber of the gravity rundown lubrication tank to the main lubrication fluid supply header in response to a pressure differential between a lubrication fluid pressure in the main lubrication fluid supply header and the static pressure of the lubrication fluid in the gravity rundown lubrication tank. The flow control system is configured to provide a first portion of the lubrication fluid from the gravity rundown lubrication tank to the main lubrication fluid supply header at a first pressure between a backup fluid pressure threshold of the main lubrication fluid supply header and a shutdown trip pressure threshold of the main lubrication fluid supply header in response to the lubrication fluid pressure in the main lubrication fluid supply header dropping below the backup fluid pressure threshold.

This, and other aspects, can include one or more of the following features. The flow control system can be configured to provide a second portion of the lubrication fluid from the gravity rundown lubrication tank to the main lubrication fluid supply header at a second pressure less than or equal to the shutdown trip pressure threshold in response to the lubrication fluid pressure in the main lubrication fluid supply header dropping below the shutdown trip pressure threshold. A first vertical height of the topmost level of the lubrication fluid corresponding to the first pressure can be about twenty-nine feet above a centerline of the turbomachinery system, and a second vertical height of the topmost level of the lubrication fluid corresponding to the second pressure can be about twenty-six feet above the centerline of the turbomachinery system. The system can include a second gravity rundown lubrication tank to retain lubrication fluid, the second gravity rundown lubrication tank positioned vertically above the turbomachinery system and vertically below the first-mentioned gravity rundown lubrication tank such that the lubrication fluid of the second gravity rundown lubrication tank comprises a static pressure based at least in part on a vertical height of the topmost level of lubrication fluid in the second gravity rundown lubrication tank above the turbomachinery system, and a second flow control system fluidly connecting the second gravity rundown lubrication tank to the main lubrication fluid supply header, the second flow control system configured to selectively flow the lubrication fluid from the second gravity rundown lubrication tank to the main lubrication fluid supply header in response to a pressure differential between the lubrication fluid pressure in the main lubrication fluid supply header and the static pressure of the lubrication fluid in the second gravity rundown lubrication tank, where the second flow control system is configured to provide a second portion of the lubrication fluid from the second gravity rundown lubrication tank to the main lubrication fluid supply header at a second pressure less than or equal to the shutdown trip pressure threshold in response to the lubrication fluid pressure in the main lubrication fluid supply header dropping below the shutdown trip pressure threshold. A first vertical height of the topmost level of the lubrication fluid in the first-mentioned gravity rundown lubrication tank corresponding to the first pressure can be about twenty-nine feet above a centerline of the turbomachinery system, and a second vertical height of the topmost level of the lubrication fluid in the second gravity rundown lubrication tank corresponding to the second pressure can be about twenty-six feet above the centerline of the turbomachinery system. The flow control system can include a fluid conduit fluidly coupling the fluid storage chamber and the main lubrication fluid supply header, and a control valve configured to selectively open the fluid conduit in response to the static pressure of the gravity rundown lubrication tank being greater than the lubrication fluid pressure in the main lubrication fluid supply header. The control valve can include at least one of a passive one-way check valve or an active isolation valve. The system can include a pressure sensor configured to detect the lubrication fluid pressure in the main lubrication fluid supply header. The system can include a standby pump configured to supply lubrication fluid to the main lubrication fluid supply header at a standby pressure greater than or equal to a low-level pressure threshold in response to the lubrication fluid pressure in the main lubrication fluid supply header to be less than the low-level pressure threshold, where the low-level pressure threshold is greater than the backup fluid pressure threshold. The low-level pressure threshold can be about 15 psi. The shutdown trip pressure threshold can be between 9 psi and 10 psi, and the backup fluid pressure threshold can be between 11 psi and 12 psi. The system can include a fluid level sensor configured to detect a static height of the lubrication fluid in the main lubrication fluid supply header.

Certain aspects of the disclosure encompass a method for lubricating a turbomachinery system. The method includes selectively opening, with a control valve, a conduit connecting a gravity rundown lubrication tank and a main lubrication fluid supply header of a turbomachinery system in response to a pressure differential between the main lubrication fluid supply header and a static pressure of the gravity rundown lubrication tank, and in response to a lubrication fluid pressure in the main lubrication fluid supply header dropping below a backup fluid pressure threshold, flowing a first portion of a lubrication fluid from the gravity rundown lubrication tank to the main lubrication fluid supply header for a first time duration and at a first pressure less than the backup fluid pressure threshold and greater than an emergency shutdown pressure threshold of the turbomachinery system.

This, and other aspects, can include one or more of the following features. The method can include flowing a second portion of the lubrication fluid from the gravity rundown lubrication tank to the main lubrication fluid supply header at a second pressure less than the emergency shutdown pressure threshold of the turbomachinery system for a second duration. Flowing the second portion of the lubrication fluid for the second duration can include flowing the second portion of the lubrication fluid after the first time duration has expired. The method can include flowing a second portion of lubrication fluid from a second gravity rundown lubrication tank to the main lubrication fluid supply header at a second pressure less than the emergency shutdown pressure threshold of the turbomachinery system for a second duration, the second gravity rundown lubrication tank connected to the main lubrication fluid supply header by a second fluid conduit and a second control valve configured to selectively open in response to the pressure differential between the main lubrication fluid supply header and a static pressure of the second gravity rundown lubrication tank. Flowing the second portion of the lubrication fluid for the second duration can include flowing the second portion of the lubrication fluid after the first time duration has expired. The control valve can include at least one of a passive one-way check valve or an active isolation valve.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 4 and 5 are flowcharts describing example methods for lubricating a turbomachinery system.

Like reference numbers and designations in the various drawings indicate like elements.

DETAILED DESCRIPTION

Figure 1:
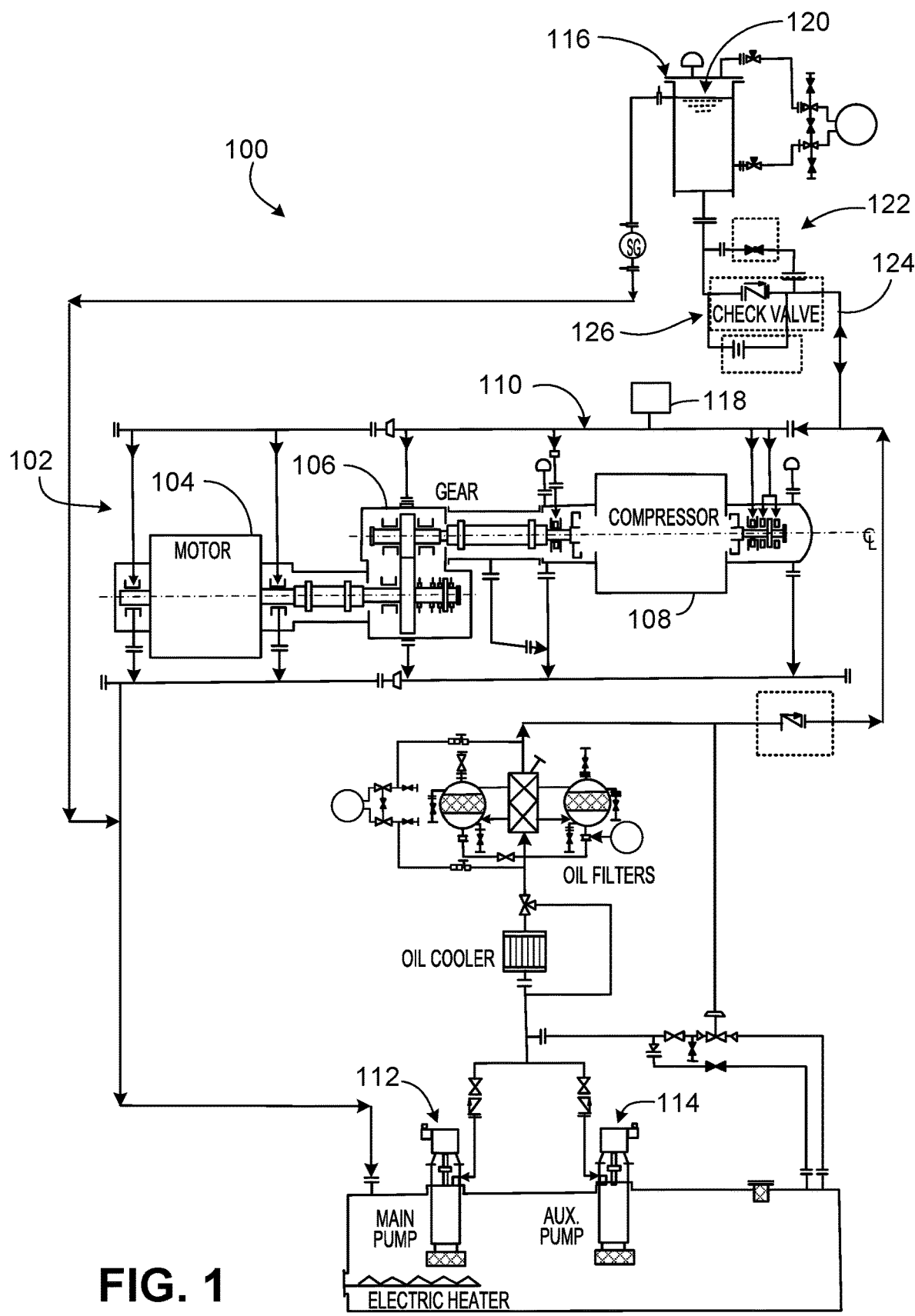
FIG. 1 is a schematic view of an example lubrication system for an example turbomachinery system.

This disclosure describes gravity rundown lubrication tanks for lubrication systems of rotating equipment, such as in turbomachinery, and describes methods of using the gravity rundown lubrication tanks to perform a new additional function. Gravity rundown lubrication tanks of the present disclosure provide online backup lubrication, emergency lubrication, or both, to rotating equipment. Gravity rundown lubrication tanks are conventionally installed at a vertical height above a centerline of rotating equipment, holding a volume of lubrication fluid during normal operation of turbomachinery, and utilize gravity as a motive force to feed lubrication fluid to the rotating equipment, bearings, or other structures of the turbomachinery in response to an operational state of the turbomachinery and an existing operating pressure of a main lubrication fluid supply header of the turbomachinery. A static pressure, or static head, of lubrication fluid in the gravity rundown lubrication tank is based at least in part on the vertical height above the turbomachinery centerline. The conventional function for gravity rundown tanks used in the industry is to provide emergency shutdown lubrication during coast down of machinery.

Gravity rundown lubrication tanks of the present disclosure provides a further function of backup lubrication fluid to turbomachinery, for example, during a switchover from a main lubrication fluid pump to a standby lubrication pump. The gravity rundown lubrication tank is also configured to provide emergency lubrication fluid to the turbomachinery when required, for example, during emergency shutdown and coast down of the turbomachinery. The gravity rundown lubrication tank has an initial static pressure that is greater than a shutdown trip pressure threshold when the gravity rundown lubrication tank is full and the turbomachinery is operating under normal conditions. The improved design proposed adds an initial static pressure greater than the shutdown trip pressure threshold, allowing the gravity rundown lubrication tank to provide lubrication fluid flow to the turbomachinery before an emergency shutdown, such as during a standby phase or pump switchover operation, and during a shutdown and coast-down of the turbomachinery. This modification can eliminate the need for separate Hydraulic Accumulators, which would be utilized to increase delay time of pressure decay in the lubrication header. The shutdown trip pressure threshold is set based on the minimum lubrication pressure for acceptable operation of the turbomachinery, where the turbomachinery initiates a shutdown operation when the supplied lubrication fluid pressure drops below the shutdown trip pressure threshold.

In conventional lubrication systems, a gravity rundown lubrication tank is designed to provide a maximum static pressure that is less than the shutdown trip pressure threshold, where the gravity rundown lubrication tank provides lubrication oil to a lubrication system only after an emergency shutdown process of the turbomachinery is initiated. In other words, conventional gravity rundown lubrication tanks are utilized only during emergency shutdown and coast-down of the turbomachinery. In the present disclosure, a gravity rundown lubrication tank, in addition to providing the features described above, also provides lubrication fluid to turbomachinery during a switchover operation of the turbomachinery, where the fluid pressure in a lubrication header of the turbomachinery drops between a backup fluid pressure threshold and a shutdown trip pressure threshold. The gravity rundown lubrication tank is raised to a vertical height to provide a static pressure of the lubrication fluid that is greater than the shutdown trip pressure threshold, for example, at a first pressure equal to the backup fluid pressure threshold or between the backup fluid pressure threshold and the shutdown trip pressure threshold. During a standby operation of the turbomachinery, the gravity rundown lubrication tank can provide a first portion of the lubrication fluid to the turbomachinery at the first pressure for a first time duration. In some instances, if the pressure in the turbomachinery continues to drop to the shutdown trip pressure threshold, an emergency shutdown of the turbomachinery is initiated and the gravity rundown lubrication tank supplies a second portion of the lubrication fluid to the turbomachinery at a second pressure that is less than or equal to the shutdown trip pressure threshold. In some implementations, the gravity rundown lubrication tank can be split into two gravity rundown tanks separate from each other or stacked on top of each other. For example, a first rundown tank positioned vertically above a second rundown tank provides the first portion of lubrication fluid at the first pressure because a static head of the first rundown tank is at the first pressure, and the second rundown tank provides the second portion of lubrication fluid at the second pressure because the static head of the second rundown tank is at the second pressure.

Lubrication systems with a gravity rundown lubrication tank having a static pressure greater than a shutdown trip pressure threshold can combine accumulator action and emergency lubrication action into the same gravity rundown lubrication tank or into two gravity rundown tanks. Adding accumulator action to the gravity rundown lubrication tank eliminates or reduces the need for accumulators, which sometimes fail from lack of maintenance, wear, material failures, or other reasons. The novel accumulator action backup pressure provides flow of lubrication fluid, or oil, to supply positive pressure assist to reduce shutdowns of turbomachinery by delaying the turbomachinery trip. This delay is variable and can provide sufficient time for startup of standby lubrication pump(s). The improved gravity rundown lubrication tank can reduce the number of auxiliary equipment, reduce maintenance, and reduce overall costs of the lubrication system. The accumulator action inherent in the gravity rundown lubrication tank has a higher reliability compared to conventional systems with accumulators due to lower possible failure modes, for example, since gravity as a motive force is more reliable than traditional accumulators using gas pistons, elastomeric bladders, or other features typically present in accumulators. The gravity rundown lubrication tank allows for additional time during switchover events, where standby pumps initiate to provide lubrication fluid to turbomachinery, which can increase the effectiveness of the standby pumps and reducing the chance of unnecessary emergency shutdown operations. In addition, the gravity assisted accumulator action function occurs without the need to provide specialized maintenance during usage and has lower possibility of failure to respond compared to Accumulators. As a result, overall operational reliability of the machinery train is increased. The lubrication system is designed, for example, so as not to require additional controls or instrumentation to provide the accumulator action.

FIG. 1 is a schematic view of an example lubrication system 100 for an example turbomachinery system 102. The example turbomachinery system 102 includes a motor 104, a gearbox 106, a compressor 108, and one or more turbomachinery bearings within the motor 104, gearbox 106, or compressor 108. The example lubrication system 100 controls lubrication fluid flow to the turbomachinery system 102, and includes a main lubrication fluid supply header 110 fluidly connected to the one or more turbomachinery bearings of the turbomachinery system 102, a main lubrication pump 112, a standby lubrication pump 114, and a gravity rundown lubrication tank 116. While FIG. 1 shows the lubrication system 100 as configured to provide lubrication to the example turbomachinery system 102, the turbomachinery system 102 can take other forms, include additional or different components, or exclude some components. For example, the turbomachinery system 102 can include or be replaced with a steam turbine, gas turbine, centrifugal compressor, centrifugal pump, or other machinery. In some examples, turbomachinery includes at least one component rated at 2000 horsepower or greater.

The main lubrication fluid supply header 110 includes a pressurized network of fluid passageways, and distributes the lubrication fluid, such as oil or other lubrication fluid types, to the turbomachinery bearing(s) or other machinery in the turbomachinery system 102 that may require lubrication. The main lubrication pump 112, standby pump 114, gravity rundown lubrication tank 116, or a combination of these components supply lubrication fluid to the main lubrication fluid supply header 110 during various operational states of the turbomachinery system 102, and based at least partially on the lubrication fluid pressure in the main lubrication fluid supply header 110. For example, the main lubrication pump 112 supplies lubrication fluid to the fluid supply header 110 under normal operating conditions, the standby pump 114 supplies lubrication fluid to the main fluid supply header 110 during a standby mode of the lubrication system, and the gravity rundown lubrication tank 116 can provide lubrication fluid to the main fluid supply header 110 during the standby mode and during a shutdown and coast-down period of the turbomachinery system 102. The lubrication fluid pressure that the example lubrication system 100 is able to provide to the turbomachinery system 102 can affect the operational state of the turbomachinery system 102. For example, if the main lubrication pump 112, fails to provide sufficient lubrication fluid pressure to the turbomachinery system 102 at a given point in time, then the gravity rundown lubrication tank 116 can provide backup fluid lubrication to the turbomachinery to assist the standby pump 114 startup period, or the turbomachinery system 102 trips and the gravity rundown lubrication tank 116 provides emergency shutdown lubrication fluid to the turbomachinery system 102. In some implementations, the lubrication system 100 includes a pressure sensor 118 coupled to the main lubrication fluid supply header 110 to detect the lubrication fluid pressure in the main lubrication fluid supply header 110 that is supplied to the turbomachinery system 102.

Figure 2:
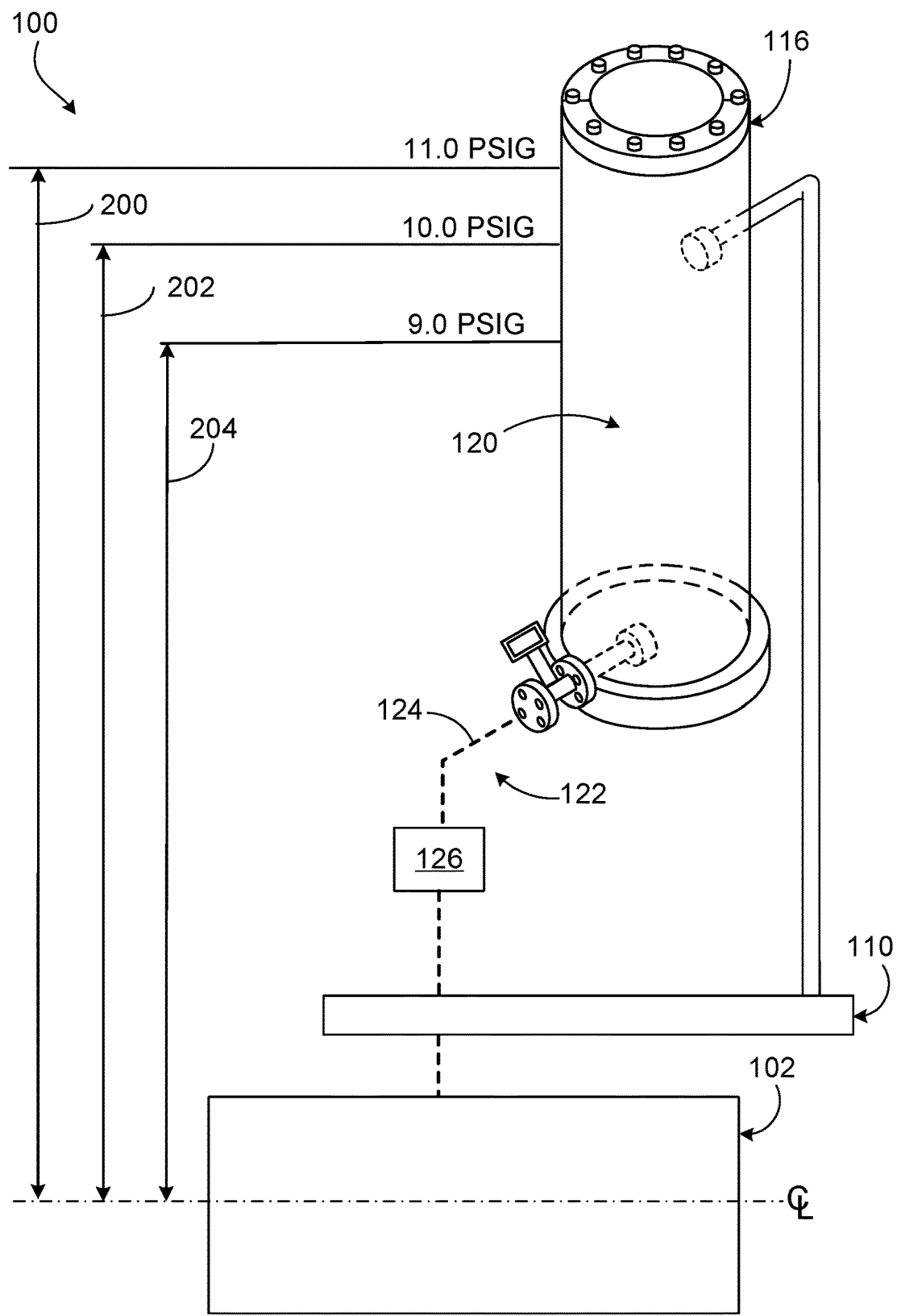
FIG. 2 is a schematic perspective view of an example lubrication system including an example gravity rundown lubrication tank that can be used in the lubrication system of FIG. 1.

The gravity rundown lubrication tank 116 can provide emergency lubrication during shutdown and coast-down of the turbomachinery system 102 and can provide backup lubrication fluid pressure during pump transfer mode of the lubrication system 100, for example, as the standby pump 114 initiates. The gravity rundown lubrication tank 116 is elevated vertically above the turbomachinery system 102 (for example, above the centerline of the turbomachinery system 102) such that lubrication fluid in the gravity rundown lubrication tank 116 has a static pressure, or static head, that is greater than an emergency shutdown trip pressure threshold of the turbomachinery system 102. The gravity rundown lubrication tank 116 supplies lubrication fluid to the main lubrication fluid supply header 110 in response to the fluid pressure in the main lubrication fluid supply header 110 dropping below the static pressure in the gravity rundown lubrication tank 116. FIG. 2 is a schematic perspective view of part of the example lubrication system 100 of FIG. 1, including the example gravity rundown lubrication tank 116. The gravity rundown lubrication tank 116 includes a fluid storage chamber 120 to retain and hold a volume of the lubrication fluid in the gravity rundown lubrication tank 116.

Referring to both FIGS. 1 and 2, a flow control system 122 fluidly connects the fluid storage chamber 120 of the gravity rundown lubrication tank 116 to the main lubrication fluid supply header 110, and includes a fluid conduit 124 that fluidly couples the fluid storage chamber 120 and the main lubrication fluid supply header 110. The example flow control system 122 also includes a check valve 126 (or other flow control valve) within the fluid conduit 124. The flow control system 122 selectively flows the lubrication fluid from the fluid storage chamber 120 of the gravity rundown lubrication tank 116 to the main lubrication fluid supply header 110, for example, based on a pressure differential between the lubrication fluid pressure in the main lubrication fluid supply header 110 and the static pressure of the lubrication fluid in the gravity rundown lubrication tank 116. For example, when the pressure differential is positive (when the pressure in the main lubrication fluid supply header 110 is greater than the static pressure in the gravity rundown lubrication tank 116), the check valve 126 is closed to prevent lubrication fluid flow between the main lubrication fluid supply header 110 and the gravity rundown lubrication tank 116. Conversely, when the pressure differential is negative (when the pressure in the main lubrication fluid supply header 110 is less than the static pressure in the gravity rundown lubrication tank 116), the check valve 126 (or other control valve) is open to allow lubrication fluid flow from the gravity rundown lubrication tank 116 to the main lubrication fluid supply header 110.

In some implementations, the flow control system 122 is passive and the check valve 126 is a passive, one-way check valve. The passive, one-way check valve 126 selectively opens the fluid conduit 124 in response to the static pressure of the lubrication fluid in the gravity rundown lubrication tank 116 being greater than the lubrication fluid pressure in the main lubrication fluid supply header 110, and closes the fluid conduit 124 in response to the static pressure of the lubrication fluid in the gravity rundown tank 116 being less than the lubrication fluid pressure in the main lubrication fluid supply header 110. The passive, one-way check valve can take a variety of forms, such as a flapper-type check valve, ball check valve, diaphragm check valve, tilting disc check valve, a lift-check valve, a combination of these, or another type of one-way check valve. In some implementations, the flow control system 122 includes a flow control device in addition to or instead of the check valve 126. For example, the flow control device can include an active control valve. The active control valve can include an actively controlled isolation valve operated automatically, and can be utilized in place of the check valve. The active control valve can open in response to the pressure differential, a measured lubrication fluid level in the main lubrication fluid supply header 110, an input from an operator, a combination of these, or in response to another input. The active control valve can take a variety of forms, such as an electric-operated valve, an air operated valve, a valve powered by some other external power source, or another non-passive type valve.

The flow control system 122 restricts fluid flow from the main lubrication fluid supply header 110 to the gravity rundown lubrication tank 116 when the pressure differential is positive, except for a recirculation fluid line that provides continuous recirculation of lubrication fluid in the gravity rundown lubrication tank 116. For example, this recirculation reduces oil stagnation and sediment accumulation in the gravity rundown lubrication tank 116, and helps maintain a temperature of the lubrication fluid in the gravity rundown tank 116 to be closer to the temperature of the lubrication fluid in the main lubrication fluid supply header 110 and at the turbomachinery bearing(s).

In some implementations, flow control system 122 excludes the check valve 126, active control valve, or both, such that the fluid conduit 124 fluidly and directly connects the fluid storage chamber 120 and the main lubrication fluid supply header 110 without a flow control valve.

As described earlier, the gravity rundown lubrication tank 116 is elevated vertically above the turbomachinery system 102 such that the lubrication fluid of the gravity rundown lubrication tank 116 has a static pressure that is greater than the shutdown trip pressure threshold, such as an initial static pressure equal to the backup fluid pressure threshold. The backup fluid pressure threshold is a pressure threshold during the standby phase that signifies the start of the backup lubrication fluid flow from the gravity rundown lubrication tank 116 to the main fluid supply header 110. The shutdown trip pressure threshold can vary, for example, based on the type of machinery, and can be manually set based on a minimum lubrication pressure needed for operation of the machinery. In most turbomachinery examples, the shutdown trip pressure threshold can be equal to or between 9 pounds per square inch (psi) gauge and 10 psi. The backup fluid pressure threshold can also vary, for example, between a low-level pressure threshold of the turbomachinery and the shutdown trip pressure threshold. In some examples, the backup pressure threshold is between 1 psi and 1.5 psi greater than the shutdown trip pressure threshold. For example, the backup fluid pressure threshold can be equal to or between 11 psi and 12 psi (for example, 11.5 psi), while automatic trip setting is about or equal to 10 psig.

The static pressure in the gravity rundown lubrication tank 116 is based at least in part on the size and shape of the gravity rundown tank 116, and the vertical elevation of the topmost level of lubrication fluid in the gravity rundown tank 116 above the centerline of the turbomachinery system 102. The gravity rundown lubrication tank 116 is installed at a desired elevation above the centerline of the turbomachinery system 102 to achieve a desired initial static pressure in the gravity rundown lubrication tank 116 that is greater than the shutdown trip pressure. In the example lubrication system 100 and turbomachinery system 102 of FIGS. 1 and 2, the gravity rundown lubrication tank 116 is cylindrical (substantially or exactly), where a central longitudinal axis is oriented vertically, and the gravity rundown tank 116 is raised to a vertical height such that the topmost level of lubrication fluid in the gravity rundown tank 116 is at a first vertical height 200 of approximately twenty-nine feet above the centerline of the turbomachinery system 102. This first vertical height 200 of twenty-nine feet effects an initial static pressure of 11 pounds per square inch (psi) gauge in the gravity rundown lubrication tank 116. The backup pressure threshold is defined by the initial static pressure of the gravity rundown tank 116, which in the example shown in FIGS. 1 and 2 is equal to about 11 psi. The first vertical height 200 can vary. For example, the first vertical height 200 can be higher or lower than twenty-nine feet depending on a desired initial static pressure in the gravity rundown lubrication tank 116. For example, the first vertical height 200 can be determined based on a desired or sufficient rundown pressure during operation of the lubrication system 100 between the low-level threshold setting and shutdown trip pressure threshold settings. This first vertical height 200 may typically be about twenty-nine feet above the turbomachinery machinery centerline, but can vary to be higher or lower than twenty-nine feet.

Having an initial static pressure greater than the shutdown trip pressure threshold allows the gravity rundown lubrication tank 116 to supply backup fluid pressure with accumulator action to the turbomachinery system 102 during a standby mode and prior to an emergency shutdown event and coast-down of the turbomachinery system 102. For example, if the lubrication pressure in the main fluid supply header 110 drops below the backup pressure threshold, the initial static pressure in the gravity rundown lubrication tank 116 becomes greater than the pressure in the main fluid supply header 110, and the gravity rundown lubrication tank 116 can flow backup lubrication fluid at the static pressure of the gravity rundown tank 116 to the main fluid supply header 110.

The static pressure in the gravity rundown lubrication tank 116 varies depending on the topmost level of the lubrication fluid within the gravity rundown tank 116, and the vertical elevation of the topmost level of the lubrication fluid above the centerline of the turbomachinery system 102.

The static pressure available at the gravity rundown tank 116 to feed the main lubrication supply header 110 is proportional to the measured height of fluid column at the top level of the fluid in the gravity rundown tank 116. As the lubrication fluid flows from the gravity rundown tank 116 to the main lubrication fluid supply header 110 during operation, the static pressure of the lubrication fluid in the gravity rundown tank 116 decreases with the decreasing elevation of the topmost level of the lubrication fluid. Also, the size and shape of the gravity rundown tank 116 can affect the change in the static pressure and the amount of time it takes for the static pressure to drop from the initial static pressure to other pressure values, such as to the shutdown trip pressure threshold. FIG. 2 shows the example gravity rundown lubrication tank 116 as cylindrical (substantially or exactly, defining a cylindrical column with a constant inner diameter along the height of the cylindrical column. The shape of the gravity rundown tank 116 can vary. For example, the shape of the gravity rundown tank 116 can be cubical, or of various geometries such as a double cylinder, or another shape that functions to hold a specified volume of lubricant. In some implementations, the inner diameter of the gravity rundown tank 116 can increase, decrease, or fluctuate in diameter along its height, for example, to effect a faster or slower change in static pressure in the gravity rundown tank 116 as the lubrication fluid flows out of the gravity rundown lubrication tank 116.

In the example of FIG. 2, the example gravity rundown lubrication tank 116 is cylindrical and the initial static pressure in the example gravity rundown lubrication tank 116 is 11 psi, where the gravity rundown tank 116 is full and the top level of the lubrication fluid is at the first vertical height 200 of twenty-nine feet above the centerline of the turbomachinery system 102. The gravity rundown tank 116 is designed to have a drop in static pressure (for example, a drop of 1 psi) from the initial static pressure equal to the backup fluid pressure threshold to the shutdown trip pressure threshold over a first time duration as the lubrication fluid flows from the gravity rundown tank 116. This first time duration is the amount of time the gravity rundown lubrication tank 116 is able to provide backup lubrication fluid to the main fluid supply header 110 at a pressure greater than the shutdown trip pressure threshold. This first time duration can be predetermined. For example, the size, shape, diameter, and other physical characteristics of the gravity rundown tank 116 can influence the first time duration for the static pressure in the tank to decrease from the initial static pressure to the shutdown trip pressure threshold. The first time duration can vary, and can be selected during initial design of the lubrication system 100. For example, the first time duration can vary in duration, for example, preferably ranging between five and thirty seconds, but can also be longer. In some examples, the first time duration is preferred to not exceed such time delays (such as thirty seconds), as lubrication pressure in the fluid supply header 110 is lower than normal and machinery components such as bearings can be negatively affected by operating with a longer delay time at lower oil feed pressure.

In the example lubrication system 100 of FIGS. 1 and 2, with the check valve 126 open and the lubrication fluid flowing from the gravity rundown tank 116 to the main fluid supply header 110, the gravity rundown tank 116 drops 1 psi in pressure (from 11 psi to 10 psi) over the first, predetermined time duration. The first, predetermined time duration may be 5 to 30 seconds, for example, depending upon the volume of oil in the gravity rundown tank 116 and the vertical height of the gravity rundown tank 116. At the end of this first time duration, the top level of the lubrication fluid drops from the first vertical height 200 (such as twenty-nine feet) to a second vertical height 202 (such as 26 feet above the centerline of the turbomachinery system 102), and the static pressure in the gravity rundown lubrication tank 116 drops about 1 psi, for example, from the backup fluid pressure threshold to the shutdown trip pressure threshold. If the pressure in the main fluid supply header 110 continues to fall to below the shutdown trip pressure threshold, for example, as sensed by pressure sensor 118, the turbomachinery system 102 trips and the shutdown and coast-down operation commences. During this shutdown and coast-down operation, the gravity rundown lubrication tank flows a second portion of the lubrication fluid to the main fluid supply header 110 for a second time duration greater than or equal to a time it takes for the turbomachinery 102 to stop. This second time duration can vary, for example, based on the type of machinery. In some examples, the second time duration is at least four minutes, such as four minutes, five minutes, or another time duration. In some implementations, the shutdown and coast-down operation includes an emptying of the lubrication fluid from the gravity rundown lubrication tank 116, where the lubrication fluid height drops from at least a third height 204 (for example, twenty-four feet above turbomachinery centerline) corresponding to a static pressure of nine psi to the bottom vertical height of the rundown lubrication tank 116.

The exact vertical height of each fluid level (for example, the first vertical height 200, the second vertical height 202, and the third vertical height 204) in the gravity rundown tank 116 constrained by the geometry of the tank 116, which can vary. However, there exists a height difference between the second vertical height 202 and the first vertical height 200 of the lubrication fluid in the gravity rundown tank 116, and the additional fluid level in the gravity rundown tank 116 (for example, additional fluid between the second vertical height 202 and the first vertical height 200) provides for extra pressure during standby pump switchover.

The pressure sensor 118 can sense the pressure in the main fluid supply header 110 to determine if it falls to the shutdown trip pressure threshold, triggering the shutdown and coast-down operation of the turbomachinery system 102. In some implementations, the lubrication system 100 can exclude pressure sensors, such as pressure sensor 118, for shutdown purposes. For example, the lubrication system 100 can operate automatically to feed emergency lubrication without needing pressure sensors. However, the turbomachinery may need to include some type of sensor to initiate shutdown. For example, the lubrication system 100 can include a fluid level sensor (not shown) to detect a static height of the lubrication fluid in the main lubrication fluid supply header 110. In instances where the fluid level sensor determines that the static height of the lubrication fluid in the main lubrication fluid supply header 110 is lower than a shutdown fluid level threshold height, then the turbomachinery system 102 can be tripped and the shutdown operation can commence. The shutdown fluid level threshold height can correlate to the threshold volume of lubrication fluid in the main fluid supply header for acceptable operation of the turbomachinery system 102, where a drop in vertical height below the shutdown fluid level threshold height prompts an emergency shutdown of the turbomachinery.

The lubrication system 100 operates at least partially in response to the lubrication fluid pressure in the main lubrication fluid supply header 110. For example, the lubrication system 100 operates under normal conditions when the turbomachinery system 102 is operating and the fluid pressure in the main lubrication fluid supply header 110 is greater than the low-level pressure threshold of the turbomachinery system 102. The main lubrication pump 112 supplies lubrication fluid to the main lubrication fluid supply header 110 at an operating pressure during normal operation of the turbomachinery system 102 and the lubrication system 100. The operating pressure can vary based on the type of machinery. In most but not all examples, the normal operating oil header pressure is between 15 and 30 pounds per square inch (psi) gauge, such as 20 psi.

The lubrication fluid pressure in the main lubrication fluid supply header 110 can fluctuate and decrease during operation of the turbomachinery system 102 and lubrication system 100. For example, the lubrication fluid pressure can fluctuate or spike, the main lubrication pump 112 can fail or deteriorate during use, or other occurrences can affect the lubrication fluid pressure. If the fluid pressure in the main fluid supply header 110 drops below the low-level pressure threshold and remains above the shutdown trip pressure threshold, the lubrication system 100 operates in a switchover mode. For example, in switchover mode, the standby lubrication pump 114 initiates and pumps lubrication fluid to the main lubrication fluid supply header 110, such as in the case of failure of the main lubrication pump 112. The low-level pressure threshold can vary, and can be established based on the type of machinery. For example, the low-level pressure threshold can be an intermediate pressure between normal operating pressure in the main fluid supply header 110 and the shutdown trip pressure threshold. In some examples, the low-level pressure threshold is between 13 and 17 psi, such as 15 psi. The standby pump 114 can supply lubrication fluid to the main supply header 110 at a variety of pressures. In some examples, the standby pump 114 is configured to supply lubrication fluid to the main lubrication fluid supply header 110 at a standby pressure that is greater than or equal to the low-level pressure threshold. For example, the standby pressure can vary between the low-level pressure threshold and the normal operational pressure, such as a standby pressure of 20 psi.

In some instances, the standby pump 114 may be slow to initiate, slow to reach full speed, or fail to build up pressure, and the pressure in the main lubrication fluid supply header 110 continues to drop to the backup fluid pressure threshold. As described earlier, the backup fluid pressure threshold is less than the low-level pressure threshold but greater than the shutdown trip pressure threshold. The gravity rundown lubrication tank 116 is designed such that the initial static pressure of the lubrication fluid in the gravity rundown lubrication tank 116 is substantially or exactly equal to the backup fluid pressure threshold. As the pressure in the main fluid supply header 110 reaches the backup pressure threshold, the check valve 126 of the flow control system opens to allow flow of lubrication fluid from the gravity rundown lubrication tank 116 to the main fluid supply header 110 because the pressure differential changes from positive to negative. The gravity rundown lubrication tank 116 is configured to provide a first portion of the lubrication fluid in the gravity rundown lubrication tank 116 to the main lubrication fluid supply header 110, for example, because the initial static pressure in the gravity rundown lubrication tank 116 is greater than the present pressure in the main fluid supply header 110. This first portion of lubrication fluid from the gravity rundown lubrication tank 116 flows to the main fluid supply header 110 at a first pressure for the first duration of time, where the first pressure is between the backup fluid pressure threshold and the shutdown trip pressure threshold. The first portion of lubrication fluid provided to the main fluid supply header 110 from the gravity rundown lubrication tank 116 during this first duration of time provides accumulator backup fluid pressure to the main fluid supply header 110, and allows for additional time for the standby pump 114 to reach operating speeds and pump lubrication fluid to the fluid supply header 110. This first time duration extends the amount of time in switchover mode. This predetermined first time duration can vary. For example, the predetermined time duration can be from five to thirty seconds. The predetermined time duration can be longer, but is not preferred to exceed such time, as described earlier.

In some instances, the standby pump 114 is slow to initiate or fails to operate, and the pressure in the main lubrication fluid supply header 110 continues to drop. If the first time duration is exhausted and the fluid pressure in the main fluid supply header 110 drops below the shutdown trip pressure threshold, the turbomachinery system 102 trips and enters into a coast-down period, where rotating equipment or other lubricated parts of the turbomachinery system 102 coast from an operating speed to a stop. In response to the fluid pressure in the main fluid supply header 110 dropping below the shutdown trip pressure threshold, the gravity rundown lubrication tank 116 begins to flow the second portion of the lubrication fluid to the main fluid supply header 110 during the coast-down period of the turbomachinery system 102. In some examples, the second portion of the lubrication fluid is the remainder of the lubrication fluid in the gravity rundown lubrication tank 116.

Figure 3:
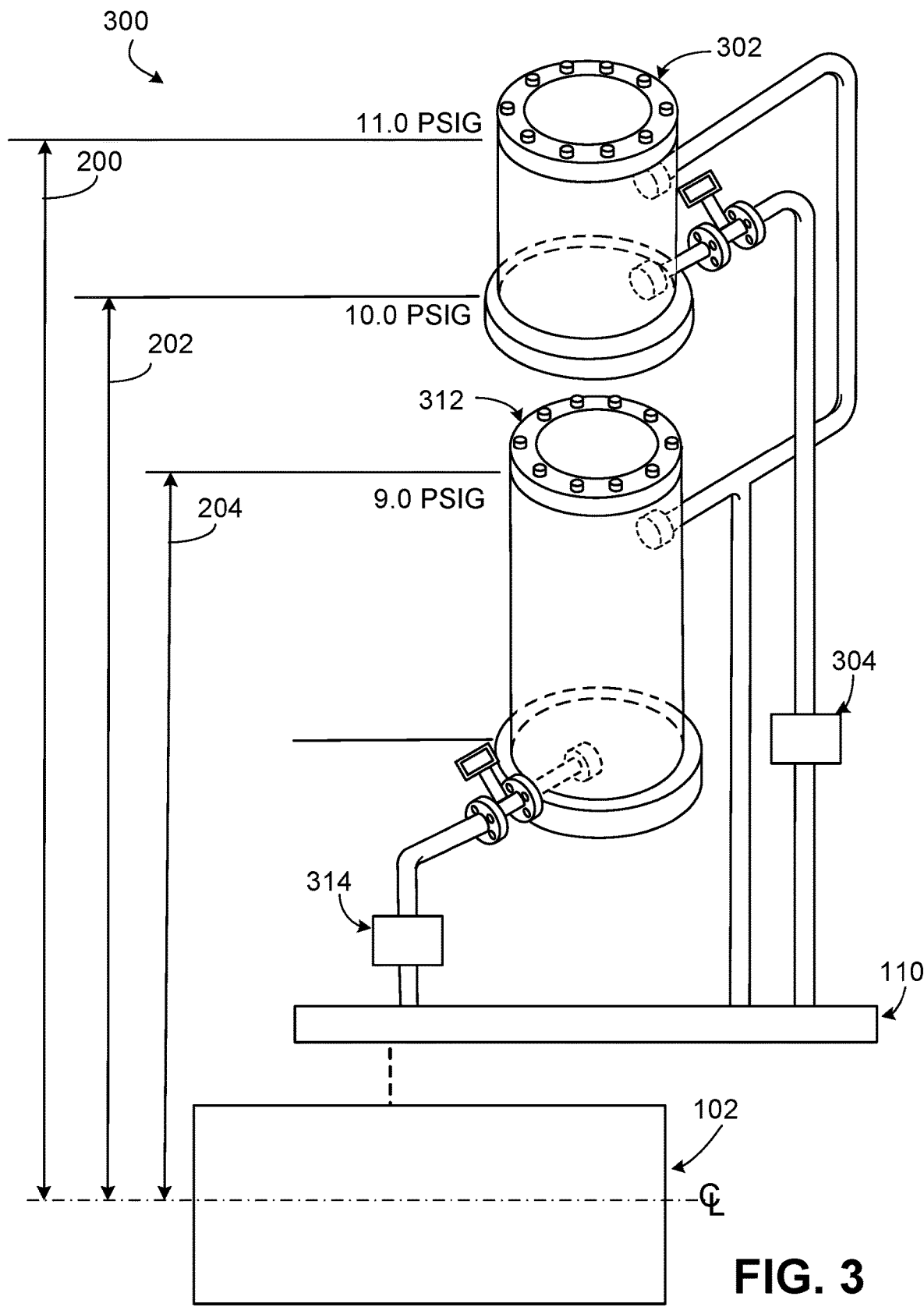
FIG. 3 is a schematic perspective view of an example lubrication system including example gravity rundown lubrication tanks that can be used in the lubrication system of FIG. 1.

In some implementations, the gravity rundown lubrication tank 116 can be split into more than one (for example, two) gravity rundown tanks separate from each other. The plurality of gravity rundown tanks (such as two gravity rundown tanks) can be stacked together, placed separately at varying heights, or otherwise positioned vertically above centerline of the main fluid supply header 110. The separate rundown tanks can provide lubrication fluid to the main fluid supply header 110 at varying fluid pressures and in response to varying pressures in the main fluid supply header 110. For example, a first rundown lubrication tank can provide the first portion of fluid at the first pressure to the main fluid supply header 110 for the first duration, and a second rundown lubrication tank can provide the second portion of fluid at the second pressure to the main fluid supply header 110 for the second duration. FIG. 3 is a schematic perspective view of an example lubrication system 300 connected to the example turbomachinery system 102 of FIGS. 1 and 2. The example lubrication system 300 is similar to the example lubrication system 100 of FIGS. 1 and 2, except the example lubrication system 300 includes a first gravity rundown tank 302 and a second gravity rundown lubrication tank 312, instead of the single gravity rundown lubrication tank 116 of the example lubrication system 100. The higher elevation tank (first gravity rundown tank 302) provides accumulator action, while the lower elevation tank (second gravity rundown tank 312) provides conventional emergency rundown oil.

A first flow control system 304 fluidly connects the first gravity rundown tank 302 to the main lubrication fluid supply header 110, and a second flow control system 314 fluidly connects the second gravity rundown tank 312 to the main lubrication fluid supply header 110. The first flow control system 304 and the second flow control system 314 are like the flow control system 122 of FIGS. 1 and 2, and can each include a fluid conduit and a control valve (such as a passive, one-way check valve, active isolation valve, or other valve type). The first flow control system 304 selectively flows the lubrication fluid from the first gravity rundown lubrication tank 302 to the main lubrication fluid supply header 110, for example, based on a pressure differential between the lubrication fluid pressure in the main lubrication fluid supply header 110 and the static pressure of the lubrication fluid in the first gravity rundown lubrication tank 302. The second flow control system 314 selectively flows the lubrication fluid from the second gravity rundown lubrication tank 312 to the main lubrication fluid supply header 110, for example, based on a pressure differential between the lubrication fluid pressure in the main lubrication fluid supply header 110 and the static pressure of the lubrication fluid in the second gravity rundown lubrication tank 312.

Both the first gravity rundown tank 302 and the second gravity rundown tank 312 are positioned at a first vertical height above the main lubrication fluid supply header 110, where the first gravity rundown tank 302 is positioned at a second vertical height above the second rundown tank 312. While FIG. 3 shows the first gravity rundown tank 302 positioned directly above the second gravity rundown tank 312, the relative locations can vary. It is the respective vertical heights above the turbomachinery centerline that determine the static pressure in the respective tanks.

The first gravity rundown lubrication tank 302 is elevated vertically above the turbomachinery system 102 such that the lubrication fluid of the first gravity rundown lubrication tank 302 has a static pressure that is greater than the shutdown trip pressure threshold, such as an initial static pressure equal to the backup fluid pressure threshold. For example, the first gravity rundown tank 302 can be raised so that the topmost level of lubrication fluid in the first gravity rundown tank 302 is at the first vertical height 200 (for example, twenty-nine feet above turbomachinery centerline). The first gravity rundown tank 302 holds the first portion of lubrication fluid that can be provided to the main fluid supply header 110 at the first pressure, for example, because the initial static head of the first gravity rundown tank 302 is greater than the shutdown trip pressure threshold and less than or equal to the backup fluid pressure threshold. In some instances, the first gravity rundown tank 302 provides the first portion of lubrication fluid to the main fluid supply header 110 over the first predetermined time duration, and the pressure in the first gravity rundown tank 302 drops about 1 psi in pressure (from 11 psi to 10 psi) over the first, predetermined time duration. At the end of this first time duration, the first gravity rundown tank 302 can be completely emptied, such that the level of the lubrication fluid drops from the first vertical height 200 (such as twenty-nine feet) to the second vertical height 202 (such as 26 feet above the centerline of the turbomachinery system 102), where the second vertical height 202 can be the vertical bottom of the first gravity rundown tank 302. The static pressure in the first gravity rundown lubrication tank 302 drops about 1 psi, for example, from the backup fluid pressure threshold to the shutdown trip pressure threshold. In some instances, the pressure differential determined by the height and geometry of the gravity rundown tank(s) can be greater than or less than 1 psi, as chosen by the user.

The second gravity rundown lubrication tank 312 is elevated above the turbomachinery system 102 such that the lubrication fluid of the second gravity rundown lubrication tank 312 has a static pressure that is less than or equal to the shutdown trip pressure threshold. For example, the second gravity rundown tank 312 can be raised so that the topmost level of lubrication fluid in the first gravity rundown tank 302 is at the second vertical height 202 (for example, approximately twenty-six feet above turbomachinery centerline), the third vertical height 204 (for example, at or between twenty-four and twenty six feet) that is lower than the second vertical height 202, or a different height. The second gravity rundown tank 312 holds the second portion of lubrication fluid that can be provided to the main fluid supply header 110 at the second pressure, for example, because the initial static head of the second gravity rundown tank 312 is less than or equal to the shutdown trip pressure threshold.

In some instances, the first gravity rundown lubrication tank 302 provides the accumulator action pressure and time delay to the turbomachinery system 102 during a switchover phase, and the second gravity rundown lubrication tank 312 provides the emergency lubrication to the turbomachinery system 102 during the shutdown and coast-down operations of the turbomachinery system 102. In some implementations, the first gravity rundown tank 302 can be mounted to the top of the second gravity rundown tank 312. In the example lubrication system 300 of FIG. 3, the first gravity rundown tank 302 and second gravity rundown tank 312 can each include its own separate or joined feed line, its own separate or joined overflow line, or other systems of fluid lines, for example, to fill, drain, maintain, or otherwise control the flow of fluid within the respective tanks during operation.

Figure 4:
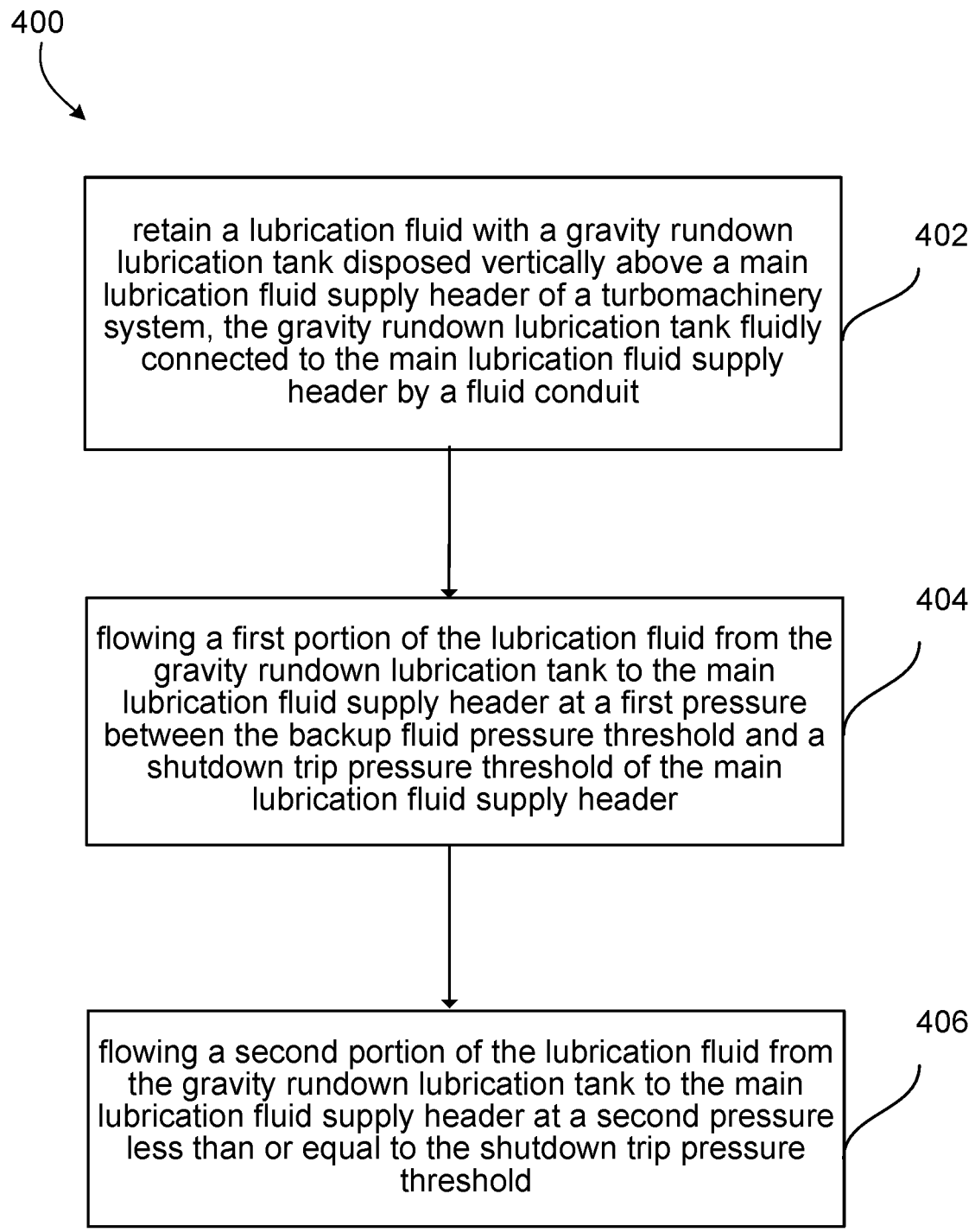

FIG. 4 is a flowchart describing an example method 400 for lubricating a turbomachinery system, for example, performed by the example lubrication system 100 and example turbomachinery system 102 of FIGS. 1 and 2, or the example lubrication system 300 and example turbomachinery system 102 of FIG. 3. At 402, a lubrication fluid is retained with a gravity rundown lubrication tank disposed vertically above a main lubrication fluid supply header of a turbomachinery system. The gravity rundown lubrication tank is fluidly connected to the main lubrication fluid supply header by a fluid conduit including a control valve, where the control valve is configured to selectively open the fluid conduit in response to a pressure differential between a lubrication fluid pressure in the main lubrication fluid supply header and a static pressure of the gravity rundown lubrication tank. At 404, in response to the lubrication fluid pressure in the main lubrication fluid supply header dropping below a backup fluid pressure threshold, a first portion of the lubrication fluid flows from the gravity rundown lubrication tank to the main lubrication fluid supply header at a first pressure between the backup fluid pressure threshold and a shutdown trip pressure threshold of the main lubrication fluid supply header, where the shutdown trip pressure threshold is less than the backup fluid pressure threshold. The first portion of lubrication fluid from the gravity rundown lubrication tank provides accumulator-like time and pressure delay capacity to the main fluid supply header. In some implementations, as shown at 406, in response to the lubrication fluid pressure in the main lubrication fluid supply header dropping below the shutdown trip pressure threshold, a second portion of the lubrication fluid flows from the gravity rundown lubrication tank to the main lubrication fluid supply header at a second pressure that is less than or equal to the shutdown trip pressure threshold. In some other implementations, in response to the lubrication fluid pressure in the main lubrication fluid supply header dropping below the shutdown trip pressure threshold, a second portion of lubrication fluid flows from a second gravity rundown lubrication tank to the main lubrication fluid supply header at a second pressure less than or equal to the shutdown trip pressure threshold.

FIG. 5 is a flowchart describing an example method 500 for lubricating a turbomachinery system, for example, performed by the example lubrication system 100 and example turbomachinery system 102 of FIGS. 1 and 2, or the example lubrication system 300 and example turbomachinery system 102 of FIG. 3. 502, a passive or active control valve (such as a passive one-way check valve or automatic control valve) selectively opens a conduit connecting a gravity rundown lubrication tank and a main lubrication fluid supply header of a turbomachinery system in response to a pressure differential between the main lubrication fluid supply header and a static pressure of the gravity rundown lubrication tank. At 504, in response to a lubrication fluid pressure in the main lubrication fluid supply header dropping below a backup fluid pressure threshold, a first portion of a lubrication fluid from the gravity rundown lubrication tank flows to the main lubrication fluid supply header for a first time duration and at a first pressure that is less than the backup fluid pressure threshold and greater than an emergency shutdown pressure threshold of the turbomachinery system.

A number of implementations have been described. Nevertheless, it will be understood that various modifications may be made without departing from the spirit and scope of the disclosure.

What is claimed is:

1. A method for lubricating a turbomachinery system, comprising:
  retaining a lubrication fluid with a gravity rundown lubrication tank disposed vertically above a main lubrication fluid supply header of a turbomachinery system, the gravity rundown lubrication tank fluidly connected to the main lubrication fluid supply header by a fluid conduit configured to selectively flow lubrication fluid in response to a pressure differential between a lubrication fluid pressure in the main lubrication fluid supply header and a static pressure of the gravity rundown lubrication tank;
  in response to the lubrication fluid pressure in the main lubrication fluid supply header dropping below a backup fluid pressure threshold, flowing a first portion of the lubrication fluid from the gravity rundown lubrication tank through the fluid conduit to the main lubrication fluid supply header at a first pressure between the backup fluid pressure threshold and a shutdown trip pressure threshold of the main lubrication fluid supply header, the shutdown trip pressure threshold being less than the backup fluid pressure threshold;
  retaining a second portion of lubrication fluid with a second gravity rundown lubrication tank disposed vertically above the main lubrication fluid supply header and vertically below the first-mentioned gravity rundown lubrication tank, the second gravity rundown lubrication tank fluidly connected to the main lubrication fluid supply header by a second fluid conduit configured to selectively flow lubrication fluid in response to a pressure differential between the lubrication fluid pressure in the main lubrication fluid supply header and a static pressure of the second gravity rundown lubrication tank; and
  in response to the lubrication fluid pressure in the main lubrication fluid supply header dropping below the shutdown trip pressure threshold, flowing a second portion of lubrication fluid from the second gravity rundown lubrication tank to the main lubrication fluid supply header at a second pressure less than or equal to the shutdown trip pressure threshold.

2. The method of claim 1, wherein the second fluid conduit comprises a second control valve, the second control valve comprising at least one of a passive one-way check valve or an active isolation valve configured to open the second fluid conduit in response to the static pressure of the second gravity rundown lubrication tank being greater than the lubrication fluid pressure in the main lubrication fluid supply header.

3. The method of claim 1, comprising detecting, with a pressure sensor connected to the main lubrication fluid supply header of the turbomachinery system, the lubrication fluid pressure in the main lubrication fluid supply header to be less than or equal to the shutdown trip pressure threshold.

4. The method of claim 3, further comprising:
  detecting, with the pressure sensor, the lubrication fluid pressure in the main lubrication fluid supply header to be less than a low-level pressure threshold; and
  in response to detecting the lubrication fluid pressure to be less than the low-level pressure threshold and prior to supplying the first portion of the lubrication fluid from the gravity rundown lubrication tank to the main lubrication fluid supply header, initiating a standby pump connected to the main lubrication fluid supply header of the turbomachinery system, the standby pump configured to supply lubrication fluid to the main lubrication fluid supply header at a standby pressure greater than the low-level pressure threshold;
  wherein the low-level pressure threshold is greater than the backup fluid pressure threshold.

5. The method of claim 4, wherein the low-level pressure threshold is about 15 psi.

6. The method of claim 1, comprising detecting, with a fluid level sensor, a static height of the lubrication fluid in the main lubrication fluid supply header to be lower than a shutdown fluid level threshold height; and
  in response to detecting the static height of the lubrication fluid in the main lubrication fluid supply header to be lower than the shutdown fluid level threshold height, flowing the second portion of the lubrication fluid from the second gravity rundown lubrication tank through the second fluid conduit to the main lubrication fluid supply header at the second pressure less than or equal to the shutdown trip pressure threshold.

7. The method of claim 1, wherein the shutdown trip pressure threshold is between 9 psi and 10 psi, and the backup fluid pressure threshold is between 11 psi and 12 psi.

8. The method of claim 1, wherein the fluid conduit comprises a passive control valve, the passive control valve comprising a passive one-way check valve configured to open in response to the static pressure of the gravity rundown lubrication tank being greater than the lubrication fluid pressure in the main lubrication fluid supply header.

9. The method of claim 1, wherein the fluid conduit comprises an active control valve, the active control valve comprising an active isolation valve configured to open in response to the static pressure of the gravity rundown lubrication tank being greater than the lubrication fluid pressure in the main lubrication fluid supply header.

10. The method of claim 1, wherein flowing the first portion of the lubrication fluid from the gravity rundown lubrication tank to the main lubrication fluid supply header at the first pressure comprises flowing the first portion of the lubrication fluid for a first time duration between five seconds and thirty seconds.

11. The method of claim 10, wherein flowing the first portion of the lubrication fluid for the first time duration comprises flowing the first portion of the lubrication fluid at the first pressure, where the first pressure decreases during the first time duration toward the shutdown trip pressure threshold.

12. The method of claim 1, wherein flowing the first portion of the lubrication fluid from the gravity rundown lubrication tank to the main lubrication fluid supply header at the first pressure comprises flowing the first portion of the lubrication fluid out of the gravity rundown lubrication tank such that the static pressure of the gravity rundown lubrication tank decreases from the backup fluid pressure threshold to the shutdown trip pressure threshold.

13. A system, comprising:
a turbomachinery system comprising a turbomachinery bearing;
a main lubrication fluid supply header fluidly coupled to the turbomachinery bearing;
a gravity rundown lubrication tank comprising a fluid storage chamber to retain a lubrication fluid in the gravity rundown lubrication tank, the gravity rundown lubrication tank positioned vertically above the turbomachinery system such that the lubrication fluid of the gravity rundown lubrication tank comprises a static pressure based at least in part on a vertical height of a topmost level of the lubrication fluid vertically above the turbomachinery system;
a flow control system fluidly connecting the fluid storage chamber to the main lubrication fluid supply header, the flow control system configured to selectively flow the lubrication fluid from the fluid storage chamber of the gravity rundown lubrication tank to the main lubrication fluid supply header in response to a pressure differential between a lubrication fluid pressure in the main lubrication fluid supply header and the static pressure of the lubrication fluid in the gravity rundown lubrication tank;
a second gravity rundown lubrication tank to retain lubrication fluid, the second gravity rundown lubrication tank positioned vertically above the turbomachinery system and vertically below the first-mentioned gravity rundown lubrication tank such that the lubrication fluid of the second gravity rundown lubrication tank comprises a static pressure based at least in part on a vertical height of the topmost level of lubrication fluid in the second gravity rundown lubrication tank above the turbomachinery system; and
a second flow control system fluidly connecting the second gravity rundown lubrication tank to the main lubrication fluid supply header, the second flow control system configured to selectively flow the lubrication fluid from the second gravity rundown lubrication tank to the main lubrication fluid supply header in response to a pressure differential between the lubrication fluid pressure in the main lubrication fluid supply header and the static pressure of the lubrication fluid in the second gravity rundown lubrication tank;
wherein the flow control system is configured to provide a first portion of the lubrication fluid from the gravity rundown lubrication tank to the main lubrication fluid supply header at a first pressure between a backup fluid pressure threshold of the main lubrication fluid supply header and a shutdown trip pressure threshold of the main lubrication fluid supply header in response to the lubrication fluid pressure in the main lubrication fluid supply header dropping below the backup fluid pressure threshold; and
wherein the second flow control system is configured to provide a second portion of the lubrication fluid from the second gravity rundown lubrication tank to the main lubrication fluid supply header at a second pressure less than or equal to the shutdown trip pressure threshold in response to the lubrication fluid pressure in the main lubrication fluid supply header dropping below the shutdown trip pressure threshold.

14. The system of claim 13, wherein a first vertical height of the topmost level of the lubrication fluid corresponding to the first pressure is about twenty-nine feet above a centerline of the turbomachinery system; and
wherein a second vertical height of the topmost level of the lubrication fluid corresponding to the second pressure is about twenty-six feet above the centerline of the turbomachinery system.

15. The system of claim 13, wherein a first vertical height of the topmost level of the lubrication fluid in the first-mentioned gravity rundown lubrication tank corresponding to the first pressure is about twenty-nine feet above a centerline of the turbomachinery system; and
wherein a second vertical height of the topmost level of the lubrication fluid in the second gravity rundown lubrication tank corresponding to the second pressure is about twenty-six feet above the centerline of the turbomachinery system.

16. The system of claim 13, wherein the flow control system comprises a fluid conduit fluidly coupling the fluid storage chamber and the main lubrication fluid supply header, and a control valve configured to selectively open the fluid conduit in response to the static pressure of the gravity rundown lubrication tank being greater than the lubrication fluid pressure in the main lubrication fluid supply header.

17. The system of claim 16, wherein the control valve comprises at least one of a passive one-way check valve or an active isolation valve.

18. The system of claim 13, further comprising a pressure sensor configured to detect the lubrication fluid pressure in the main lubrication fluid supply header.

19. The system of claim 18, further comprising a standby pump connected to the main lubrication fluid supply header and configured to supply lubrication fluid to the main lubrication fluid supply header at a standby pressure greater than or equal to a low-level pressure threshold in response to the lubrication fluid pressure in the main lubrication fluid supply header to be less than the low-level pressure threshold, where the low-level pressure threshold is greater than the backup fluid pressure threshold.

20. The system of claim 19, wherein the low-level pressure threshold is about 15 psi.

21. The system of claim 13, wherein the shutdown trip pressure threshold is between 9 psi and 10 psi, and the backup fluid pressure threshold is between 11 psi and 12 psi.

22. The system of claim 13, further comprising a fluid level sensor configured to detect a static height of the lubrication fluid in the main lubrication fluid supply header.

23. A method for lubricating a turbomachinery system, comprising:
selectively opening, with a control valve, a conduit connecting a gravity rundown lubrication tank and a main lubrication fluid supply header of a turbomachinery system in response to a pressure differential between the main lubrication fluid supply header and a static pressure of the gravity rundown lubrication tank;
in response to a lubrication fluid pressure in the main lubrication fluid supply header dropping below a backup fluid pressure threshold, flowing a first portion of a lubrication fluid from the gravity rundown lubrication tank to the main lubrication fluid supply header for a first time duration and at a first pressure less than the backup fluid pressure threshold and greater than an emergency shutdown pressure threshold of the turbomachinery system; and flowing a second portion of lubrication fluid from a second gravity rundown lubrication tank to the main lubrication fluid supply header at a second pressure less than the emergency shutdown pressure threshold of the turbomachinery system for a second duration, the second gravity rundown lubrication tank connected to the main lubrication fluid supply header by a second fluid conduit and a second control valve configured to selectively open in response to the pressure differential between the main lubrication fluid supply header and a static pressure of the second gravity rundown lubrication tank.

24. The method of claim 23, wherein flowing the second portion of the lubrication fluid for the second duration comprises flowing the second portion of the lubrication fluid after the first time duration has expired.

25. The method of claim 23, wherein the control valve comprises at least one of a passive one-way check valve or an active isolation valve.

26. A method for lubricating a turbomachinery system, comprising:

retaining a lubrication fluid with a gravity rundown lubrication tank disposed vertically above a main lubrication fluid supply header of a turbomachinery system, the gravity rundown lubrication tank fluidly connected to the main lubrication fluid supply header by a fluid conduit comprising an active control valve and configured to selectively flow lubrication fluid in response to a pressure differential between a lubrication fluid pressure in the main lubrication fluid supply header and a static pressure of the gravity rundown lubrication tank, wherein the active control valve comprises an active isolation valve configured to open in response to the static pressure of the gravity rundown lubrication tank being greater than the lubrication fluid pressure in the main lubrication fluid supply header; and in response to the lubrication fluid pressure in the main lubrication fluid supply header dropping below a backup fluid pressure threshold, flowing a first portion of the lubrication fluid from the gravity rundown lubrication tank through the fluid conduit to the main lubrication fluid supply header at a first pressure between the backup fluid pressure threshold and a shutdown trip pressure threshold of the main lubrication fluid supply header, the shutdown trip pressure threshold being less than the backup fluid pressure threshold.

* * * * *